May 3, 1949.　　　　　J. McLAUCHLAN　　　　　2,468,938
TORCH CONTROLLING FIXTURE FOR
FLAME CUTTING MACHINES
Filed June 14, 1945　　　　　　　　　　　　　　2 Sheets-Sheet 1
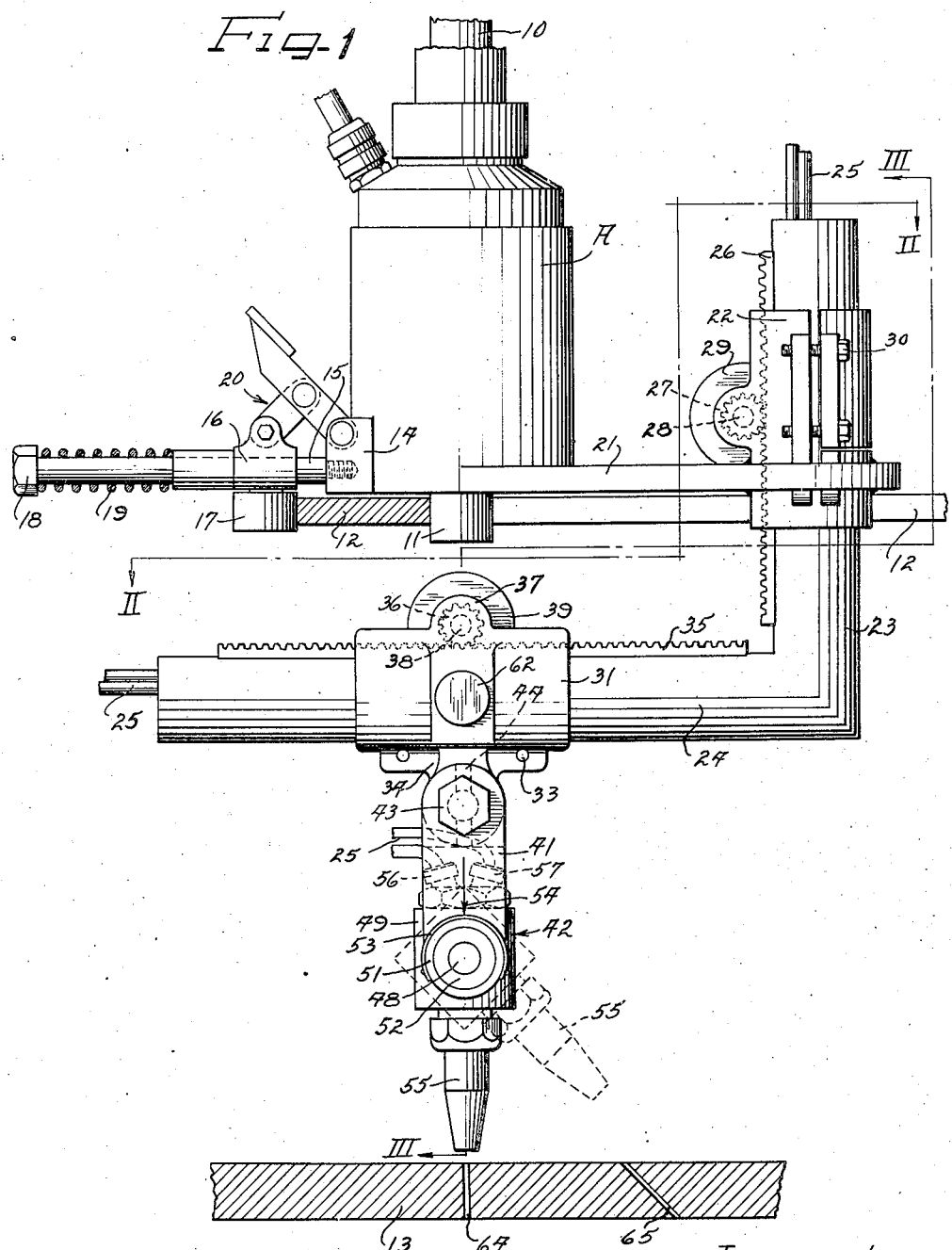
Inventor
John McLauchlan

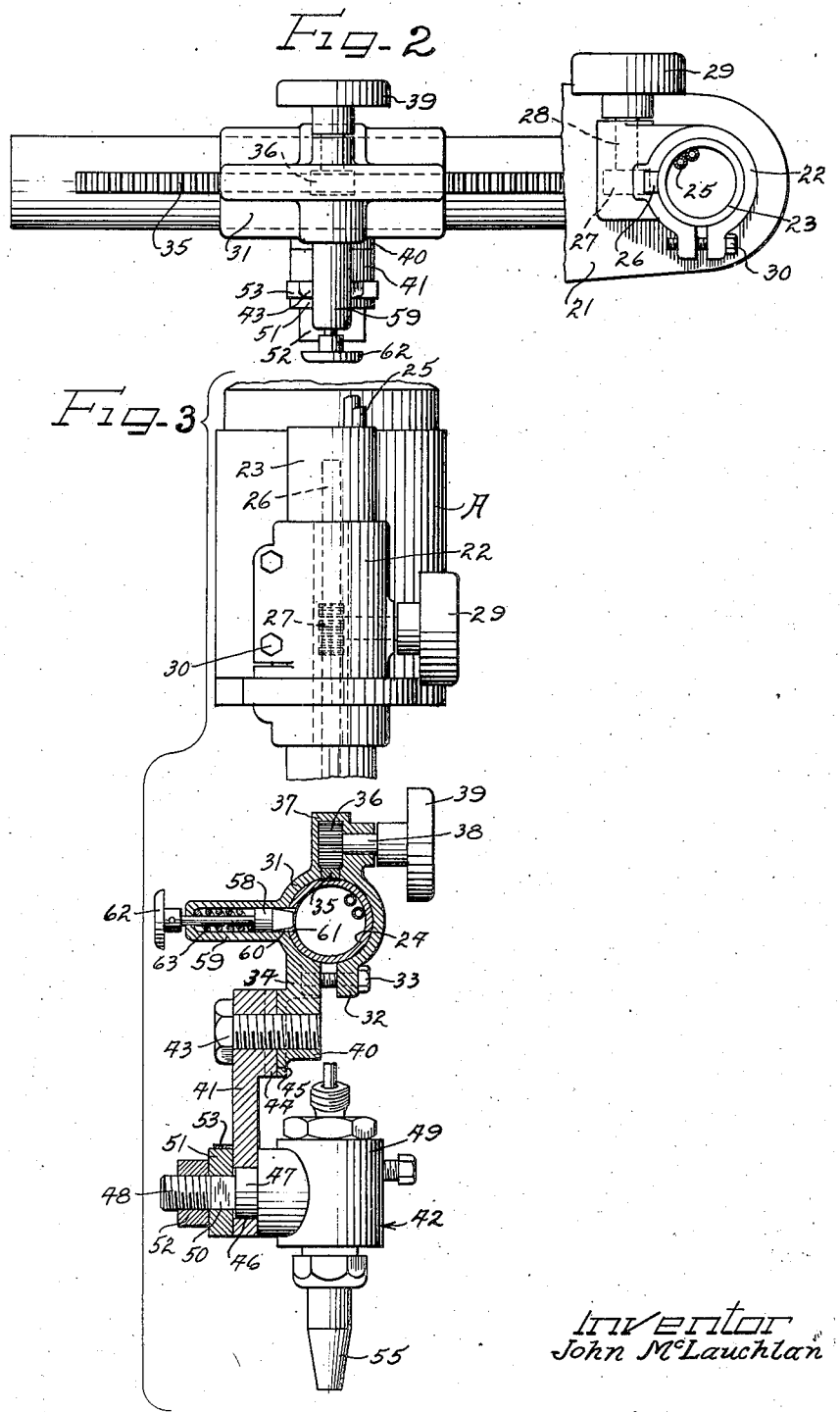

Patented May 3, 1949

2,468,938

UNITED STATES PATENT OFFICE 2,468,938

TORCH CONTROLLING FIXTURE FOR FLAME CUTTING MACHINES

John McLauchlan, Royal Oak, Mich., assignor to Houdaille-Hershey Corporation, Detroit, Mich., a corporation of Michigan Application June 14, 1945, Serial No. 599,469

1 Claim. (Cl. 266—23)

My invention relates to shape cutting machine by which the cutting is done by flame, such as oxyacetylene flame, for cutting large area parts from plates of forgings, as, for example, armor plates. In machines of this type a tracer head carries a torch supporting fixture and is supported by a pantograph linkage for travel under cam control for application of the flame along the desired cutting line determined by the cam. My invention concerns particularly an improved torch supporting and controlling fixture for machines of this type.

An important object of the invention is to provide a torch supporting fixture or holder adjustable through a relatively wide range and adapted particularly for cutting circular holes in work to the desired bevel angles.

A further object is to provide an adjustable fixture or holder on which a torch nozzle is adjustable and where such adjustment may be made for varying the bevel angle while the tracer head which supports the fixture follows a cam which determines the line of cutting on the work.

A further object is to provide a fixture on which a single flame torch is adjustable during operation of the machine for straight, angular or bevel cutting while the torch is being moved bodily along the predetermined cutting line on the work.

The above referred to and other features of the invention are embodied in the structure shown on the accompanying drawings in which:

Figure 1 is a side elevation of a tracer head structure and the torch supporting fixture thereon;

Figure 2 is a view on plane II—II Figure 1; and

Figure 3 is a view on plane III—III Figure 1.

The fixture shown on the drawings is carried by the magnetic tracer head A of a flame cutting machine, this head being supported from a pantograph structure (not shown) so as to be movable horizontally in any desired direction to follow a cam or pattern in accordance with which a flame cut is to be made. A motor driven shaft structure 10 extends down through the head and has secured to its lower end a driving roller 11 for engagement with pattern cams, this roller being kept magnetized by suitable magnet means (not shown) within the head A. On the drawings, an annular cam 12 is shown for guidance of the head and torch fixture thereon for cutting of a circular hole in a work piece 13, which may be a piece of armor plate. This cam is rigidly mounted on the work piece and in the arrangement shown, the head A is adjusted vertically for engagement of the driving roller with the inner edge of the cam.

Extending transversely of the head A at the lower end thereof and secured thereto is a block 14 having studs 15 extending outwardly from its ends for mounting a carriage 16 which journals at its end rollers 17 for engaging with the outer edge of the cam 12, these studs at their outer ends being threaded to receive abutment nuts 18 for springs 19 which encircle the studs between the nuts and the carriage 16, these springs tending to shift the carriage for pressure engagement of the rollers 17 and the cam 12. A toggle structure 20 between the carriage and the block 14 is operable to shift the carriage 16 outwardly for release of the rollers from the cam.

Extending from the side of the head A opposite the block 14 is a horizontal plate or shelf 21 which may be integral with the head housing or may be secured thereto in any suitable manner. At its outer end this shelf has a vertical clamping sleeve or collar 22 secured thereto through which extends the vertical leg 23 of a supporting bracket whose horizontal leg 24 extends below the shelf and the head A. These bracket legs are tubular for the extension therethrough of tubing or hose 25 for conducting the combustion medium to the torch which will be described later. Secured to the leg 23 is a rack 26 engaged by a gear 27 on the shaft 28 journaled on the collar 22 and having a hand wheel or knob 29 on its outer end for turning of the shaft for engagement of the gear with the rack for vertical adjustment of the supporting bracket structure. The collar 22 is preferably split so that it may be clamped by bolts or screws 30 to the bracket structure to lock it to the collar after vertical setting thereof by turning of the wheel 29.

On the horizontal arm 24 of the torch supporting bracket is mounted the torch holder collar 31 which is split on its lower side, the rear half terminating in a flange 32 through which screws 33 extend for threading into the supporting body 34 depending from the front half whereby the collar may be clamped rigidly to the arm 24 after setting of the collar upon the arm. On top of the arm and parallel therewith is a rack bar 35 rigidly secured to the arm and this rack bar is engaged by a gear 36 within the enlargement 37 on the collar, the gear being mounted on the end of a shaft 38 terminating in a hand wheel 39. After the clamping screws 33 have been withdrawn to unclamp the collar, the collar may be adjusted longitudinally along the arm 24 by turning of the hand wheel 39, and after such adjustment the holder collar is reclamped to the arm.

The body 34 depends from the collar 31 and terminates in a head 40 which supports the link or plate 41 on which the torch 42 is mounted. A screw 43 extends through the upper end of the plate 41 for threading into the supporting body 34, the plate having diametrally opposite tongues 44 engaging in corresponding grooves 45 in the head so that, when the screw is tightened, the plate will be rigidly held to the body 34 against rotation thereon.

At its lower end the plate 41 has the cylindrical opening 46 therethrough for receiving the cylindrical portion 47 of a stud 48 extending from the body 49 of the torch 42. Outwardly of this cylindrical stud portion, the stud has the polygonal or square portion 50 for receiving a washer 51 having a corresponding polygonal opening therethrough, the stud at its outer end being cylindrical and threaded to receive a nut 52. The torch 42 may thus be rotated for setting in the desired angular position relative to the plate 41, to be locked in such set position by the nut 52, the washer turning with the torch and having a scale strip 53 secured thereto for cooperation with a pointer 54 on the plate 41. The axis of the gear 36 and the axis of the screw 43 and of the stud 48 are in a common plane at right angles to the axis of the bracket arm 24, and when the torch 42 is adjusted on the plate 41 for vertical cutting by the flame from the torch nozzle 55, the nozzle axis will be in this common plane and then the central or zero point on the scale band 53 will be at the pointer 54, the scale indications reading in opposite directions from zero. By means of this scale, the torch may be readily adjusted on the plate 41 for setting of the nozzle for the desired angle of cut. On the torch body are coupling heads 56 and 57 for hose connection for delivery of combustion elements, such as acetylene gas and oxygen, to the torch body for flow through the nozzle for ignition to produce the cutting flame. As shown, the hose or conductors 25 for connection with the coupling heads 56 and 57 extending through the tubular arms 23—24 of the supporting bracket structure.

Figure 1 shows the driving roller 11 on the tracer head in engagement with the inner edge of a cam ring, which may be circular for cutting of circular holes in work, such as armor plates. The common plane hereinbefore referred to, which extends through the axis of the gear 36 and the axes of the screw 43 and stud 48 is shown also as extending through the axis of the driving roller and the axis of the tracer head A, the scale band 53 indicating zero as the axis of the nozzle 55 is also in this common plane, as shown by the full lines on Figure 1. For holding the holder clamp 31 on the arm 24 in this position with the various axes referred to all in a common plane, a latch bolt 58 is preferably provided, this bolt being movable in the housing arm 59 extending radially from the clamp collar for projection through an opening 60 in this collar into the opening 61 in the arm 24, the stem for the bolt terminating in a knob 62, and a spring 63 tending to hold the bolt in the arm opening 61.

When the driving shaft 10 through the tracer head is now driven by a suitable motor for rotation of the driving roller 11, the tracer head with the torch supporting fixture thereon will revolve in a circle under guidance of the cam ring 12 for flame cutting through the kerf line 64 which line of cut is at right angles to the work piece 13, and with the circular cam 12, a cylindrical piece will be cut out of the work piece which has a cylindrical edge, leaving a cylindrical circular edge around the hole which is left in the work.

The diameter of the cut, with the setting shown on Figure 2, would substantially be the inner diameter of the cam ring 42 less the diameter of the driving roller 11. If a larger or smaller diameter cut is desired to be made, the clamping bolts 33 will be released and the latch bolt 58 will be withdrawn from the bracket arm 24 and the hand wheel 39 will then be turned for shift of the cam collar 31 on the arm 24 for the desired cut diameter, and the clamp bolts retightened for holding the clamp collar in its set position, and the machine is then started for the desired cut.

If instead of a cylindrical cut, an angular or bevel cut is desired, the torch 42 is adjusted on the plate 41 for setting of the nozzle axis for the desired bevel cut, the dotted lines on Figure 1 showing the torch set for a forty-five degree bevel cut. After this setting of the torch, the clamping collar 22 around the bracket arm 23 is released and the hand wheel 29 is turned to shift the bracket down to bring the end of the nozzle 55 in proper cutting position above the work piece 13 for flame cutting along the bevel kerf line 65. By the setting of the holder clamp 31 on the arm 24, the desired diameter of the cutting circle may be determined.

With the supporting fixture structure shown and described, a complete circular plate or bevel hole may be cut in a piece of work such as armor plate, and with the adjustments provided, the bevel angle can be varied while the fixture follows the cam.

I have shown a practical and efficient embodiment of the features of my invention but I do not desired to be limited to the exact construction, arrangement and operation shown and described as changes may be made without departing from the scope of the invention as defined in the appended claim.

I claim as my invention:

A flame cutting attachment for the tracer head of a flame cutting machine, comprising a supporting shelf extending radially from the tracer head, a sleeve on said shelf with its axis parallel with the tracer axis, an L-bracket having a vertical leg and a lateral leg extending on the lower end thereof, said vertical leg extending upwardly through said sleeve, a rack bar on said vertical arm engaging said sleeve to hold said vertical arm against rotation, a gear journaled on said sleeve to mesh with said rack whereby said vertical arm may be longitudinally adjusted in said sleeve for vertical setting of said bracket relative to work to be cut, a holder sleeve receiving said horizontal bracket arm, a rack secured on said horizontal arm and engaging with said sleeve for holding said sleeve against rotation on said arm, a gear on said sleeve meshing with said rack bar whereby said sleeve may be set in longitudinal direction on said lateral arm, a nozzle structure pivoted on said holder for angular setting thereof for the desired angle of application of the nozzle structure flame to the work to be cut whereby straight edge cutting or bevel edge cutting may be performed on the work during travel of the tracer head.

JOHN McLAUCHLAN.

(References on following page)

REFERENCES CITED

The following references are of record in the file of this patent:

UNITED STATES PATENTS

| Number | Name | Date |
|---|---|---|
| 1,554,101 | Krebs et al. | Sept. 15, 1925 |
| 2,017,430 | Anderson | Oct. 15, 1935 |
| 2,107,396 | Schoitz | Feb. 8, 1938 |
| 2,178,938 | Ohmstede | Nov. 7, 1939 |
| 2,202,130 | Wagner | May 28, 1940 |
| 2,296,832 | Bowers | Sept. 29, 1942 |
| 2,377,844 | Stone | June 5, 1945 |

FOREIGN PATENTS

| Number | Country | Date |
|---|---|---|
| 230,571 | Great Britain | Mar. 19, 1925 |